Aug. 31, 1926.

A. T. BALDWIN 1,598,111

DRY BATTERY

Filed March 17, 1923

INVENTOR
ALLEN T. BALDWIN
BY
ATTORNEYS

Patented Aug. 31, 1926.

1,598,111

UNITED STATES PATENT OFFICE.

ALLEN T. BALDWIN, OF MONTCLAIR, NEW JERSEY, ASSIGNOR, BY MESNE ASSIGNMENTS, TO NATIONAL CARBON COMPANY, INC., OF NEW YORK, N. Y., A CORPORATION OF NEW YORK.

DRY BATTERY.

Application filed March 17, 1923. Serial No. 625,846.

My invention relates to dry batteries, and particularly to a casing therefor. The object of my invention is to provide a simple and economical casing of such construction that access cannot be had to the battery terminals for theft of current without a telltale rupture of the casing.

In the accompanying drawings—

Figure 1:
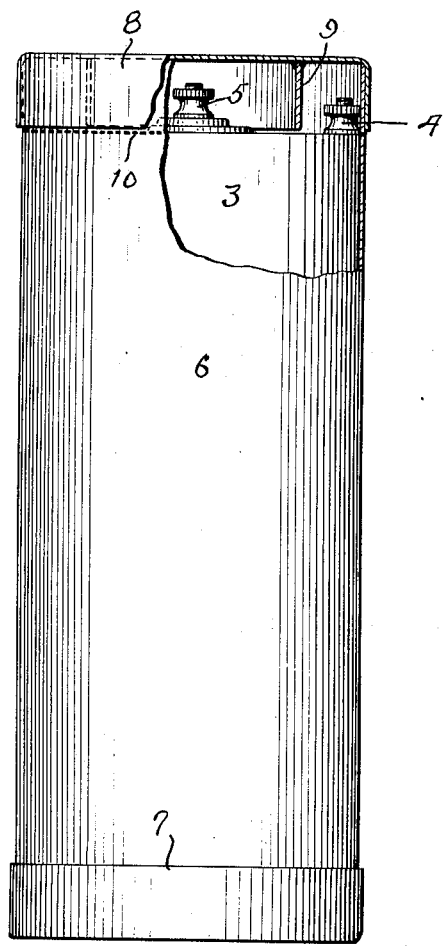
Figure 2:
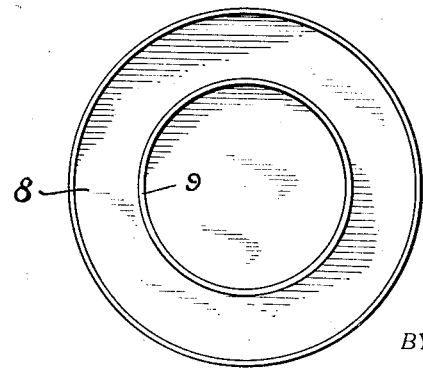

Figure 1 is a broken elevation of a battery and casing to which my invention is applied in one form; and Fig. 2 is an inverted plan of the sealing cap at the terminal end of the casing.

While I am aware that it has been hitherto proposed to cover one of the battery terminals to prevent surreptitious connection thereto and partial or complete exhaustion of the battery before it reaches the purchaser's hands, such constructions have not proved practically efficient, or have been of such expensive character as to prohibit their use. There is at the present time no inexpensive and efficient sealed container on the market for batteries of the type to which the invention relates, which accomplishes the desired result. My invention provides a seal, which, without adding appreciably to the expense of the casing, effectively accomplishes the desired object.

In the form shown, the battery proper is of common type, comprising a cylindrical zinc shell 3 having at one end an associated terminal 4, and also a control carbon bar or the like (not shown) having an associated terminal 5 at the same end of the battery. Both wire terminals project beyond the end of the battery body defined by the shell 3.

Surrounding the shell 3 is an insulating paper or frangible fiber casing 6, sealed at the lower end of the battery by the cap 7, and at the terminal end by the cap 8. Inasmuch as the cap 8 must be spaced from the body of the battery to afford clearance for the terminals 4 and 5, I provide it with a supporting ring 9 which surrounds the central terminal 5 and reinforces the central area of the cap 8 against breakage incident to the handling and shipment of the battery.

Both caps 7 and 8 are permanently sealed to the casing 6. In order to obtain access to the terminals 4 and 5 it is necessary to remove the cap 8, or to puncture it in telltale fashion. To facilitate the removal of the cap by the purchaser, the casing 6 is scored at 10 at a point substantially coincident with the end of the shell 3 of the battery. The flange of the cap 8 is also made of such depth that it just clears the scoring ring 10. To free the cap, it is merely necessary to press the cap flange inward, thus rupturing the casing on the score line 10, whereupon the cap may be removed to expose the terminals 4 and 5. The rupture of the casing on the line 10 is facilitated by reason of the fact that the scoring is substantially coincident with the edge of the shell 3, and a shearing action across the edge of the metal occurs upon the inward pressure of the cap flange.

The particular construction of the terminals 4 and 5 may be modified in many ways, and those shown are indicated by way of example. Again the casing 6 may be cupped at the terminal end of the battery, the cupped end of the casing, instead of the independent cap 8, forming the seal.

Various other modifications of construction will readily occur to those dealing with the problem without departing from what I claim as my invention.

I claim—

1. In a dry battery, a battery body having a metallic shell, and at one end a pair of terminals projecting beyond the end of the shell, in combination with a frangible insulating casing surrounding the shell and extending beyond and sealing said terminals against access, said casing being weakened substantially in the plane of the shell and to facilitate the rupture of the wall of the casing to permit the removal of the terminal enclosing end and the exposure of the terminals for connection thereto.

2. In a dry battery, a battery body having a metallic shell, and at one end a pair of terminals projecting beyond the end of the shell, in combination with a frangible insulating casing surrounding the shell and extending beyond and sealing said terminals against access, said casing being scored substantially in the plane of the shell and to facilitate the rupture of the wall of the casing to permit the removal of the terminal enclosing end and the exposure of the terminals for connection thereto, said terminal enclosing end of the casing being spaced from the body of the battery and having a central supporting ring surrounding one of said terminals.

3. A dry battery comprising a metallic shell, and terminals at one end thereof projecting beyond the end of the shell, in combination with a tubular insulating casing of frangible material surrounding the shell and extending beyond the wire terminals, together with a terminal sealing cap having a flange sleeving said end of the casing and sealed thereto, the flange of said cap extending substantially to the plane of the end of the battery shell, and the insulating casing being scored substantially at the edge of said cap flange to facilitate the rupture of the casing by inward pressure applied at a point beyond the end of the battery shell to permit the removal of the cap and the sleeved portion of the casing to expose the terminals for connection thereto.

4. A dry battery comprising a metallic shell, and terminals at one end thereof projecting beyond the end of the shell, in combination with an insulating casing of frangible material comprising a jacket surrounding the battery shell, and a cap closure for the terminal end of the battery, said cap sleeving upon the insulating jacket for the shell and being sealed thereto to prevent access to the battery terminals, said casing being weakened substantially in the plane of the end of the battery shell to facilitate the rupture and removal of the cap portion of the casing to expose the terminals.

In testimony whereof I have signed my name to this specification.

ALLEN T. BALDWIN.